United States Patent [19]

Miyagawa et al.

[11] Patent Number: 4,719,515
[45] Date of Patent: Jan. 12, 1988

[54] METHOD OF GENERATING SYNCHRONIZING SIGNALS

[75] Inventors: Ichirou Miyagawa; Noboru Arai, both of Kanagawa, Japan

[73] Assignee: Fuji Photo Film Co., Ltd., Kanagawa, Japan

[21] Appl. No.: 899,356

[22] Filed: Aug. 22, 1986

[30] Foreign Application Priority Data

Aug. 23, 1985 [JP] Japan ................. 60-185096

[51] Int. Cl.⁴ .............................................. H04N 1/04
[52] U.S. Cl. ................................ 358/268; 258/285; 258/208
[58] Field of Search ............... 358/285, 268, 208, 199

[56] References Cited

U.S. PATENT DOCUMENTS

| | | | |
|---|---|---|---|
| 3,937,883 | 2/1976 | Tanimoto | 358/268 |
| 4,414,583 | 11/1983 | Hooker, III | 358/208 |
| 4,559,562 | 12/1985 | Kramer | 358/208 |
| 4,571,623 | 2/1986 | Schoon | 358/208 |

Primary Examiner—Edward L. Coles, Sr.
Attorney, Agent, or Firm—Sughrue, Mion, Zinn, Macpeak, and Seas

[57] ABSTRACT

A synchronizing signal is generated in relation to the scanning of a recording medium with a scanning light beam emitted from a scanning light source and deflected by a light deflector. A synchronizing-signal generating laser beam is emitted from a synchronizing-signal generating laser source, and deflected by the light detector in synchronous relation to the deflection of the scanning light beam. The synchronizing-signal generating laser beam deflected by the light detector is applied back to the synchronizing-signal generating laser source at least once when the synchronizing-signal generating laser beam is deflected through a prescribed angle during one scanning cycle. A change in the output power of the synchronizing-signal generating laser source which is caused upon application of the synchronizing-signal generating laser beam back to the synchronizing-signal generating laser source, is detected for thereby generating the synchronizing signal.

3 Claims, 10 Drawing Figures

METHOD OF GENERATING SYNCHRONIZING SIGNALS

BACKGROUND OF THE INVENTION

1. Field of the Invention

The present invention relates to a method of generating synchronizing signals, and more particularly to a method of generating synchronizing signals for determining a point from which to start effective scanning on each scanning line in a light beam scanning process.

2. Description of the Prior Art

Light beam scanning has heretofore been employed to scan a recording medium with a light beam for reading out any of various forms of information, such as image information, recorded on the recording medium, or recording such information on the recording medium.

In the light beam scanning, a light beam such as a laser beam is deflected by a light deflector such as a rotating polygonal mirror to scan a recording medium (main scanning), while at the same time the recording medium is moved (subscanning) in a direction substantially normal to the direction in which the recording medium is scanned by the light beam. When information is to be recorded on the recording medium, the light beam is modulated with an information signal by an acousto-optic modulator, and the recording medium is scanned by the modulated light beam. For reading out information from the recording medium, the light beam is scanned over the recording medium, and secondary light, such as transmitted light or reflected light, which has been generated from the recording medium by the scanning, is detected to read out the recorded information.

One method of reading out recorded information with light beam scanning is disclosed in U.S. Pat. No. 4,410,799, for example. According to this method, a stimulable phosphor sheet with radiation image information recorded thereon is scanned with stimulating light such as a laser beam to emit secondary light, which is photoelectrically read out by a photoelectric read-out means such as a photomultiplier.

In the disclosed light beam scanning process, it is generally necessary to align points from which to start effective scanning on respective main scanning lines that are formed on the recording medium by a light deflector. For example, the points from which to start effective scanning are aligned with each other in the subscanning direction to eliminate any positional displacement thereof in the main scanning direction. If these effective scanning starting points were positionally displaced from each other in the main scanning direction, a phenomenon called "jitter" is produced, distorting or otherwise adversely affecting the recorded or read-out image information.

To prevent the scanning starting points from being positionally displaced, there has been proposed a method of generating a synchronizing signal when a light beam passes through a predetermined reference position on each scanning line. Effective scanning on each scanning line is started on the basis of the generated synchronizing signal, i.e. simultaneously with the synchronizing signal or upon elapse of a given period of time from the generation of the synchronizing signal. Upon the start of the effective scanning, the scanning light beam begins to be modulated by the information signal for recording information, or the secondary light emitted from the recording medium by the scanning light beam begins to be read out for reproducing the recorded information.

FIGS. 8 and 9 of the accompanying drawings illustrate a conventional arrangement for generating a synchronizing signal. A light beam 2 emitted from a light source 1 passes through a collimator lens 3 and a cylindrical lens 4 and falls on a rotating polygonal mirror 5. The light beam 2 is then reflected by one of reflecting surfaces 5a of the mirror 5 and travels through a toric lens 6 and an fθ lens 7, falling on a recording medium 8. A synchronizing signal generator 9 comprising a slit plate 9a and a photoelectric detector 9b is disposed laterally of the recording medium 8. In each scanning cycle, the light beam 2 passes through a slit 9c of the slit plate 9a and is detected by the photoelectric detector 9b, which then produces an output signal serving as a synchronizing signal. The output signal (synchronizing signal) from the photoelectric detector 9b has a waveform as shown in FIG. 10. A time t1 at which the synchronizing signal attains a given level is employed as a reference time. The position which is reached by the light beam 2 upon elapse of a given period of time from the reference time t1 is determined as a point from which to start effective scanning.

During operation, the polygonal mirror 5 rotates about its own axis in the direction of the arrow A to deflect the light beam 2 in the direction of the arrow B, thereby scanning the recording medium 8 in the direction of the arrow C (main scanning). In one scanning cycle, the recording medium 8 is scanned by the light beam 2 which is deflected in one sweep in the direction of the arrow B by angular movement of one reflecting surface 5a.

However, the prior method of determining effective scanning starting points with respect to the reference time has proven unsatisfactory. It has been found that the reference time for the synchronizing signal to reach the given level should not be subject to fluctuation, or any fluctuation of the reference time should be extremely small.

The synchronizing signal generated by the conventional method has a rise time Δt1 or a maximum signal level which varies due to reflecting irregularities of the reflecting surface of the rotating polygonal mirror, variations in the speed of rotation of the rotating polygonal mirror, and blocking of the light beam by the lens system. Such variations in the rising transition period of the synchronizing signal cause the time t1 to fluctuate within the rise time Δt1. Since the synchronizing signal generated by the prior method has a large rising transition period, i.e. the rise time Δt1 is long, the time t1 tends to fluctuate to a large extent. Therefore, the conventional synchronizing signal has not been accurate enough to bring the effective scanning starting points into mutual alignment.

SUMMARY OF THE INVENTION

It is an object of the present invention to provide a method of generating a synchronizing signal of high accuracy with a reference time for determining scanning starting points that is subject to extremely small fluctuation.

According to the present invention, there is provided a method of generating a synchronizing signal in relation to the scanning of a recording medium with a scanning light beam emitted from a scanning light source and deflected by a light deflector. The method comprises the steps of emitting a synchronizing-signal generating laser beam from a synchronizing-signal generating laser source; deflecting the synchronizing-signal generating laser beam with the light detector in synchronous relation to the deflection of the scanning light beam; applying the synchronizing-signal generating laser beam deflected by the light detector back to the synchronizing-signal generating laser source at least once when the synchronizing-signal generating laser beam is deflected through a prescribed angle during one scanning cycle; and detecting a change in the output power of the synchronizing-signal generating laser source which is caused upon application of the synchronizing-signal generating laser beam back to the synchronizing-signal generating laser source, for thereby generating the synchronizing signal.

When the synchronizing-signal generating laser beam is applied back to the synchronizing-signal generating laser source, noise is induced in the synchronizing-signal generating laser source, whereupon the output power from the synchronizing-signal generating laser source is instantaneously increased. The synchronizing signal is produced when the output power from the synchronizing-signal generating laser source is thus instantaneously increased. The change or increase in the output power from the laser source is very sharp, and therefore the synchronizing signal based on the output power change has a sharp rising transition.

The scanning light source and the synchronizing-signal generating laser source may be separate from each other. However, where the scanning light source is a laser beam source, it may double as the synchronizing-signal generating laser source.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
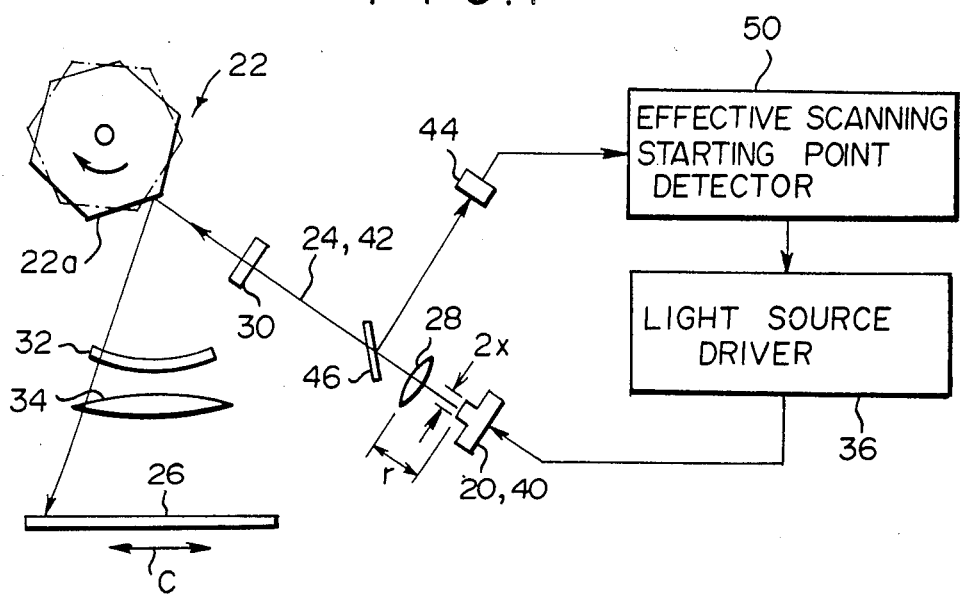
FIGS. 1, and 3 through 6 are schematic plan views, partly in block form, of light scanning devices employing methods of generating synchronizing signals according to different embodiments of the present invention.

Like or corresponding parts are denoted by like or corresponding reference characters throughout the several views.

FIG. 1 shows a light scanning device for recording information on a recording medium, the light scanning device employing a method of generating synchronizing signals according to an embodiment of the present invention.

The light scanning device comprises a scanning light source 20 in the form of a semiconductor laser and a light deflector 22 in the form of a rotating polygonal mirror. The rotating polygonal mirror 22 deflects a scanning light beam, i.e. laser beam 24 emitted from the semiconductor laser 20, to scan a recording medium 26.

More specifically, the laser beam 24 emitted from the semiconductor laser 20 passes through a collimator lens 28 which renders laser beam rays parallel. The laser beam 24 from the collimator lens 28 then travels through a cylindrical lens 30 and falls as a linear image on a reflecting mirror surface 22a of the rotating polygonal mirror 22. The laser beam 24 is reflected by the reflecting surface 22a and passes through a toric lens 32 and an fθ lens 34 onto the recording medium 26. When the polygonal mirror 22 rotates about its own axis, the laser beam 24 is deflected thereby in a main scanning direction (indicated by the arrow C) over the recording medium 26. At the same time, the recording medium 26 is moved in a subscanning direction (normal to the sheet of FIG. 1) which is perpendicular to the main scanning direction, so that the recording medium 26 is two-dimensionally scanned by the laser beam 24. The light scanning device is arranged to record information. The semiconductor laser 20 is energized by a light source driver 36 which includes a modulator (not shown) for modulating the laser beam 24 with information to be recorded on the recording medium 26.

The light scanning device is associated with a synchronizing signal generator. The synchronizing signal generator shares the semiconductor laser 20, the scanning laser beam 24, and the rotating polygonal mirror 22 with the light scanning device. More specifically, the synchronizing signal generator has a laser beam source 40 doubling as the semiconductor laser 20. The laser beam source 40 and the rotating polygonal mirror 22 jointly serve as a synchronizing-signal generating optical system, which is so arranged that a laser beam 42 doubling as the scanning laser beam 24 emitted from the laser beam source 40 will impinge perpendicularly on one reflecting surface 22a of the rotating polygonal mirror 22 once when the reflecting surface 22a is in a certain angular position (indicated by the dot-and-dash line) during one scanning cycle in which the laser beam 42 is being deflected by the reflecting surface 22a. The synchronizing signal generator also includes a light detector 44 serving as a power change detector for detecting a change in the output power from the laser beam source 40 to generate a synchronizing signal.

When the laser beam 42 falls on one reflecting surface 22a in perpendicular relation thereto, the laser beam 42 is reflected thereby, i.e. is deflected through 180°, to travel back toward the laser beam source 40. The reflected beam 42 always goes back to the laser beam source 40 once in each scanning cycle when the reflecting surface concerned reaches the same angular position. Stated otherwise, the reflected laser beam 42 falls back on the laser beam source 40 when the laser beam 42, i.e. the scanning laser beam 24, is deflected through the same angle in each scanning cycle.

The laser beam 42 falling back on the laser beam source 40 induces noise in the laser beam source 40, which then produces an instantaneously increased output. The light detector 44 detects the power of the laser beam 42 which is branched off by a half-silvered mirror 46 positioned in the optical path along which the laser beam 42 travels from the laser beam source 40 to the rotating polygonal mirror 22. Therefore, the output from the light detector 44 is instantaneously increased when the laser beam 42 impinges back on the laser beam source 40. The instantaneous increase in the output of the light detector 44 can be used as a synchronizing signal.

The synchronizing signal thus produced by the light detector 44 is then applied to an effective scanning starting point detector 50, which determines a point from which to start effective scanning based on the applied synchronizing signal. For example, the effective scanning starting detector 50 determines a point from which to start effective scanning upon elapse of a prescribed period of time after a time at which the synchronizing signal reaches a certain level. The effective scanning starting point which is determined in this manner is fed to the modulator in the light source driver 36, whereupon the modulator starts modulating the scanning laser beam 24 with information desired to be recorded. The modulation of the scanning laser beam 24 is interrupted upon elapse of a predetermined interval of time, and will be effected again from an effective scanning starting point in a nest scanning cycle. The above cycle is repeated for successively scanning the recording medium 26.

Figure 2:
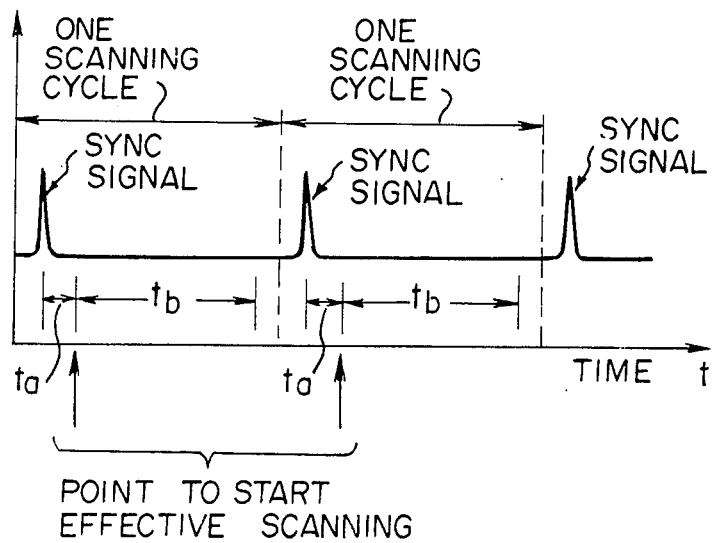
FIG. 2 is a diagram showing synchronizing signals generated by the arrangement shown in FIG. 1.

FIG. 2 shows a sequence of such repeated cycles by way of example. As illustrated, a synchronizing signal is generated at an early stage in each scanning cycle. In each scanning cycle, an effective scanning starting point is established upon elapse of a time ta from the synchronizing signal, and effective scanning is carried out for a time period tb from the effective scanning starting point. This operation is repeated in successive scanning cycles.

Figure 3:
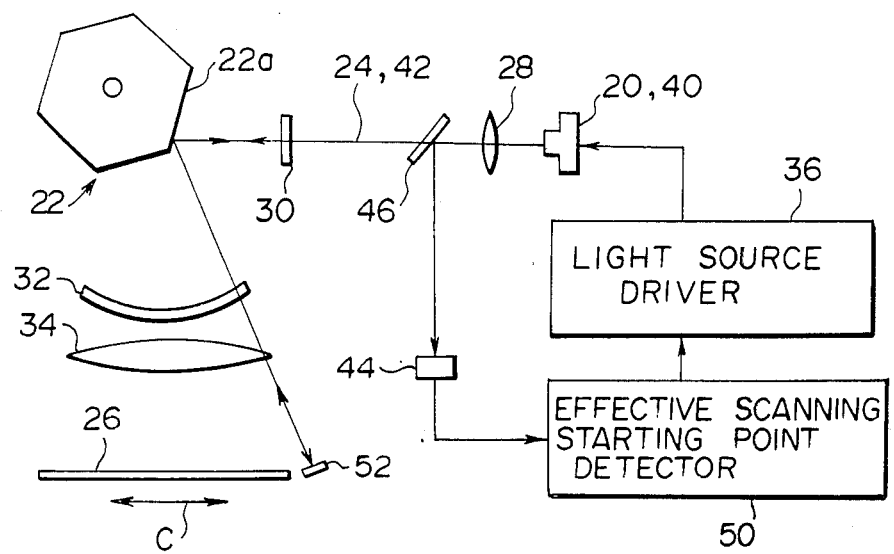

FIG. 3 illustrates an information-recording light scanning device incorporating a method of generating synchronizing signals according to another embodiment of the present invention.

The light scanning device of FIG. 3 is itself identical to that shown in FIG. 1, but is associated with a different synchronizing signal generator. The synchronizing signal generator has a synchronizing-signal generating optical system comprising the laser beam source 40, the rotating polygonal mirror 22, and a mirror 52 which is positioned laterally of the recording medium 26 in the vicinity of a side edge thereof at a starting end of the beam deflection stroke. The mirror 52 is arranged such that when the laser beam 42 as deflected by the rotating polygonal mirror 22 falls on the mirror 52, the direction in which the laser beam 42 impinges on the mirror 52 is normal to the mirror surface of the mirror 52, with the result that the laser beam 42 applied to the mirror 52 is reflected thereby to travel back exactly along the incoming laser beam path toward the laser beam source 40. The other structures are the same as those shown in FIG. 1.

In the embodiments illustrated in FIGS. 1 and 3, a rotating polygonal mirror is employed as the light detector 22. However, any type of reflecting light detector such as a galvanometer mirror may also be used as the light detector 22. In the embodiment of FIG. 3, the laser beam 42 is reflected by the mirror 52 back to the laser beam source 40. The light deflector 22 does not need to be of the reflecting type, but may be a hologram scanner or an acousto-optic deflector.

The laser beam source 40 may comprise any other type of laser beam source instead of the semiconductor laser, such as a gas laser or a solid-state laser. Where the semiconductor laser is employed as the laser beam source, the detector 44 for detecting a change in the output power from the laser beam source 40 may be replaced with a current-change detector for detecting a change in the current for energizing the semiconductor laser, or a light detector such as a PIN photodiode that is normally included in the semiconductor laser for detecting the laser output power. In case the current-change detector or the light detector such as a PIN photodiode is employed, the half-silvered mirror 46 shown in FIGS. 1 and 3 is dispensed with, and the light scanning device is small in size and inexpensive to construct.

Figure 4:
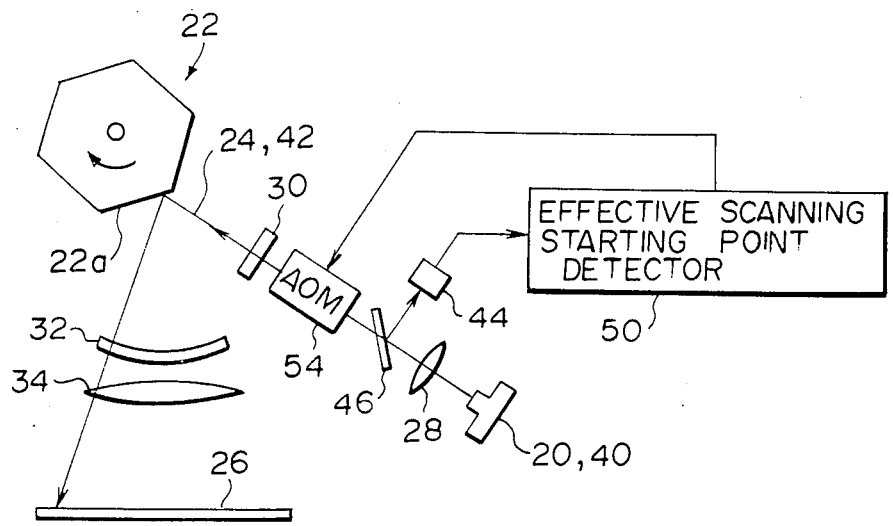

According to still another embodiment shown in FIG. 4, an acousto-optic modulator (AOM) 54 is disposed between the half-silvered mirror 46 and the cylindrical lens 30 for modulating the laser beam with information to be recorded. The other structural details of FIG. 4 are identical to those of FIG. 1. The synchronizing-signal generating optical system employing the mirror 52 as shown in FIG. 3 may be incorporated in the light scanning device of FIG. 4.

Figure 5:
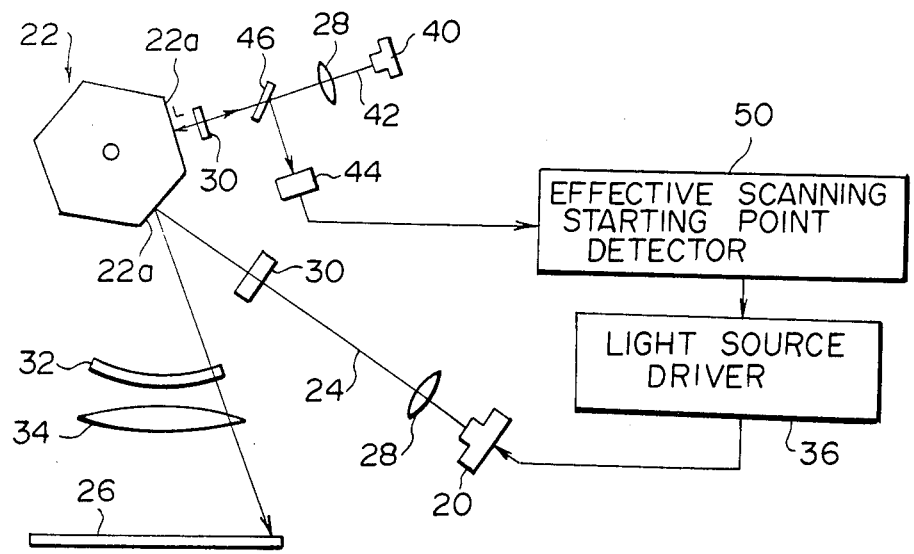

FIG. 5 illustrates a light scanning device according to a still further embodiment of the present invention. The light source 40 for generating synchronizing signals is disposed separately from the laser beam source 20 for scanning the recording medium 26. The light source 40 may be a laser beam source or any of other light sources. In the illustrated arrangement, the synchronizing-signal generating optical system is arranged such that the laser beam 42 from the light source 40 will be applied perpendicularly to a reflecting surface 22a of the rotating polygonal mirror 22 once in each scanning cycle. However, the synchronizing-signal generating optical system as shown in FIG. 3 may be utilized in the light scanning device of FIG. 5. Furthermore, the AOM 54 shown in FIG. 4 may be disposed in the path of the laser beam 24, in which case the modulator in the light source driver 36 may be dispensed with. In FIG. 5, the laser beams 42, 24 are shown as being applied on different reflecting surfaces of the rotating polygonal mirror 22, they may be applied to one reflecting surface.

Figure 6:
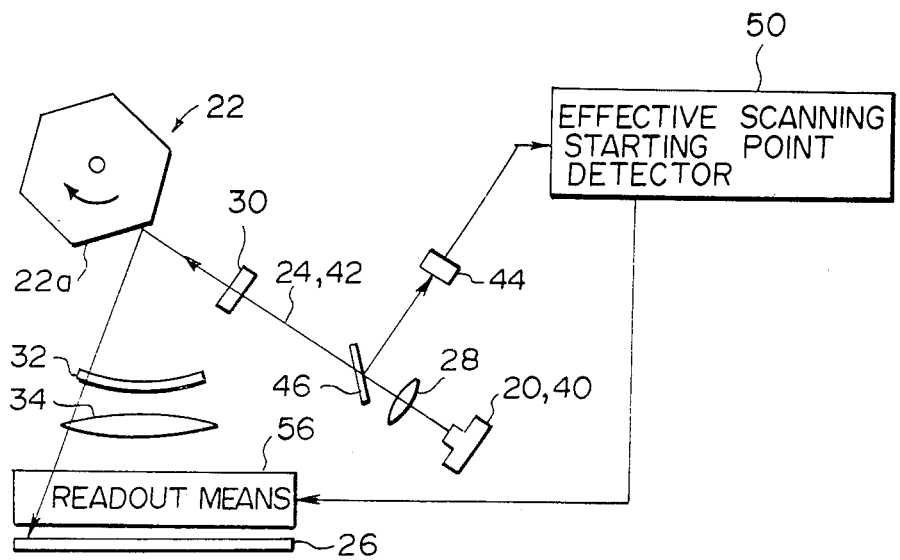

FIG. 6 shows a light scanning device for reading out recorded information, the light scanning device employing a method of generating synchronizing signals according to the present invention. The light scanning device of FIG. 6 includes the same synchronizing signal generator and effective scanning starting point detector 50 as those shown in FIG. 1. The light scanning device of FIG. 6 differs from that of FIG. 1 in that there is required no modulator for modulating the scanning laser beam 24 with information to be recorded, and a photoelectric read-out means 56 such as a photomultiplier is provided for reading out secondary light reflected or emitted from a recording medium 26 when it is scanned by the laser beam 24. A signal indicative of an effective scanning starting point which is generated by the effective scanning starting point detector 50 is applied to the photoelectric read-out means 56, which then starts reading out the information-bearing secondary light from the recording medium 26. After the secondary light has been read out for a certain period of time, the information read-out process is interrupted, and thereafter the secondary light will start to be read out in response to a next signal representing an effective scanning starting point. Such a cycle is repeated to read out the recorded information in successive scanning cycles.

It is possible to utilize the synchronizing signal generators shown in FIGS. 1, 3 and 5 in the light scanning device of FIG. 6 for reading out recorded information. The recording medium 26 may be of any type insofar as desired information can be recorded thereon by light beam scanning or information recorded thereon can be read out by light beam scanning.

Figure 7:
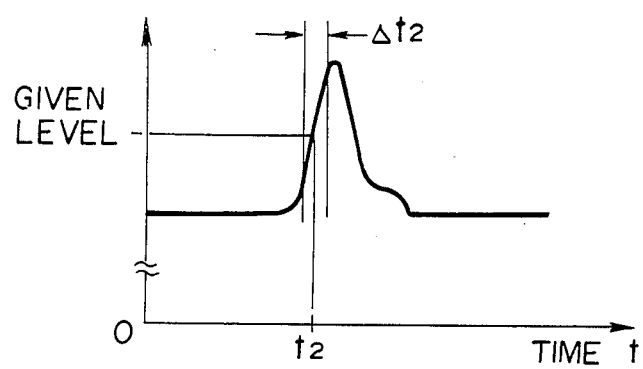
FIG. 7 is a diagram illustrating one of the synchronizing signals shown in FIG. 2.
Figure 8:
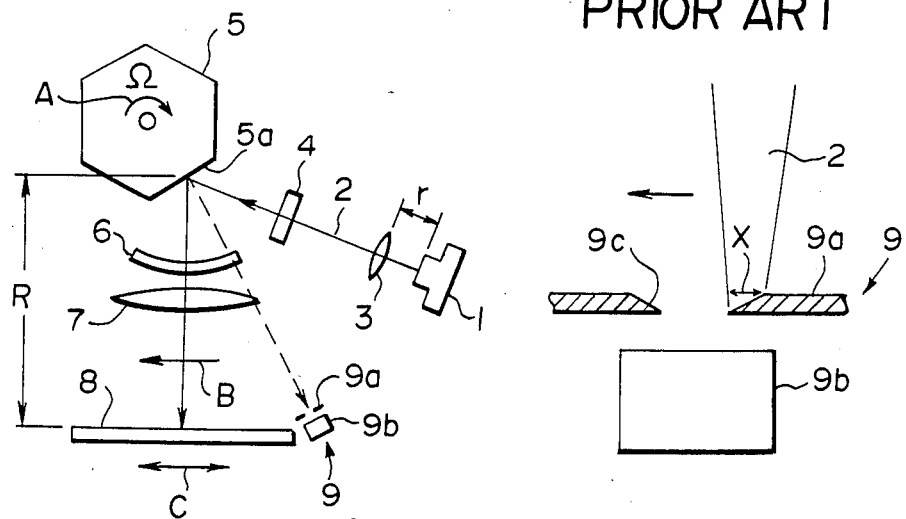
FIG. 8 is a schematic plan view, partly in block form, of a light scanning device employing a conventional method of generating synchronizing signals.
Figure 9:
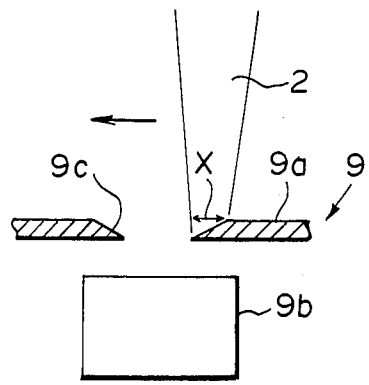
FIG. 9 is a fragmentary enlarged plan view of a synchronizing signal generator.

FIG. 7 shows a synchronizing signal generated in response to a change in the output power of a synchronizing-signal generating laser beam source upon application of a laser beam back to the laser beam source. As shown, the synchronizing signal has a sharper rising transition than the synchronizing signal (FIG. 10) generated by the conventional synchronizing signal generator composed of a slit plate and a light detector. Therefore, the rise time t2 is shorter, and hence the time t2 at which the synchronizing signal reaches a given level and which is used as a reference for determining an effective scanning starting point, is subject to a smaller range of fluctuation, resulting in higher accuracy of effective scanning starting points.

Figure 10:
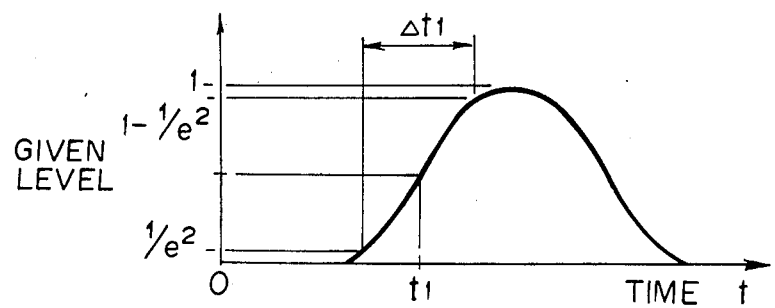
FIG. 10 is a diagram of a synchronizing signal generated by the arrangement shown in FIG. 8.

The rise time $\Delta t1$ of the conventional synchronizing signal shown in FIG. 10 is expressed by:

$$\Delta t1 = (kX/2R\Omega)$$

where
- X: the diameter of a light beam spot ($1/e^2$);
- R: the distance from a point on a rotating polygonal mirror surface on which the light beam falls to the recording medium;
- $\Omega$: the speed of rotation of the rotating polygonal mirror; and
- k: a correction coefficient by a lens such as the f$\theta$ lens.

The rise time $\Delta t2$ of the synchronizing signal shown in FIG. 1 is given by:

$$\Delta t2 = (x/2r\Omega)$$

where
- 2x: the width of an active layer of the semiconductor laser;
- r: the focal length of the collimator lens; and
- $\Omega$: the speed of rotation of the rotating polygonal mirror.

Assuming that
- $X = 10^{-1}$ (mm)
- $R = 300$ (mm)
- $k = 1.2$
- $x = 5 \times 10^{-4}$ (mm) and
- $r = 5$ (mm), the rise time $\Delta t2$ is expressed by:

$$\Delta t2 = \tfrac{1}{4}\Delta t1$$

irrespective of the speed of rotation of the rotating polygonal mirror, and hence the rise time $\Delta t2$ becomes $\tfrac{1}{4}$ of the rise time $\Delta t1$. As a result, any fluctuation of the time t2 is reduced to about $\tfrac{1}{4}$ of the fluctuation of the time t1.

According to the method of the present invention, information on the position where the scanning light beam is deflected is derived from the position where the synchronizing-signal generating light beam is deflected. Consequently, these light beams must be applied in synchronous relation or be identical to each other.

Although certain preferred embodiments have been shown and described, it should be understood that many changes and modifications may be made therein without departing from the scope of the appended claims.

We claim:

1. A method of generating a synchronizing signal in relation to the scanning of a recording medium with a scanning light beam emitted from a scanning light source and deflected by a light deflector, said synchronizing signal having an output power, and said method comprising the steps of:
   (i) emitting a synchronizing-signal generating laser beam from a synchronizing-signal generating laser source;
   (ii) deflecting the synchronizing-signal generating laser beam with said light deflector in synchronous relation to the deflection of said scanning light beam;
   (iii) applying the synchronizing-signal generating laser beam deflected by said light deflector back to said synchronizing-signal generating laser source at least once when the synchronizing-signal generating laser beam is deflected through a prescribed angle during one scanning cycle; and
   (iv) detecting a change in said output power of said synchronizing-signal generating laser source which is caused upon application of the synchronizing-signal generating laser beam back to said synchronizing-signal generating laser source, for thereby generating the synchronizing signal.

2. A method according to claim 1, wherein said scanning light source comprises a laser beam source and doubles as said synchronizing-signal generating laser source.

3. A method according to claim 1, wherein said light deflector comprises a reflecting light deflector having at least one reflecting surface, and the synchronizing-signal generating laser beam emitted from said synchronizing-signal generating laser source is applied perpendicularly to said reflecting surface of the reflecting light deflector and reflected thereby back to said synchronizing-signal generating laser source once in each scanning cycle.

* * * * *